L. J. HARRIS.
POWER TRANSMITTING DEVICE.
APPLICATION FILED JAN. 10, 1902.
932,467.
Patented Aug. 31, 1909.
5 SHEETS—SHEET 1.
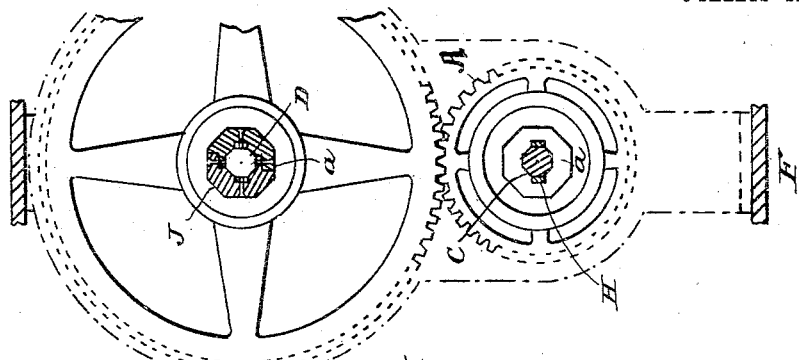
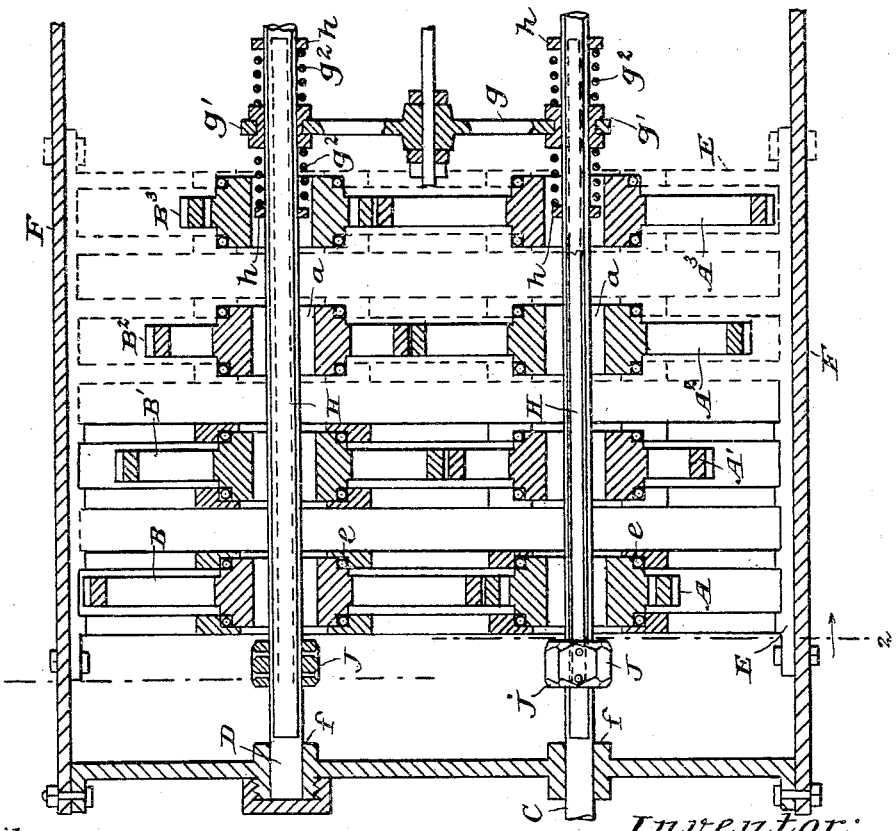

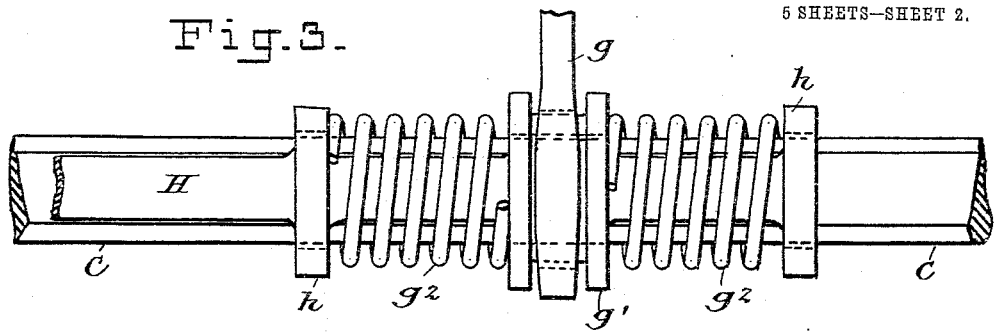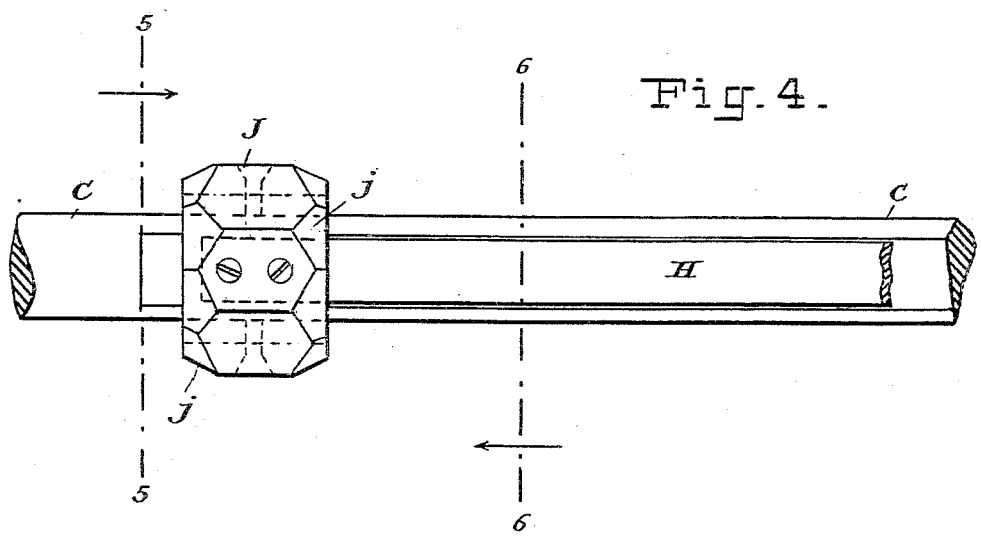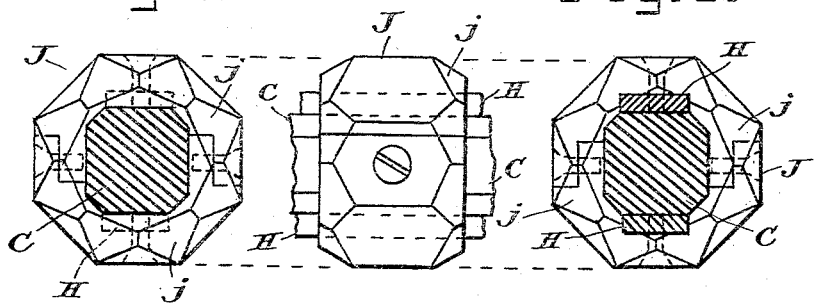

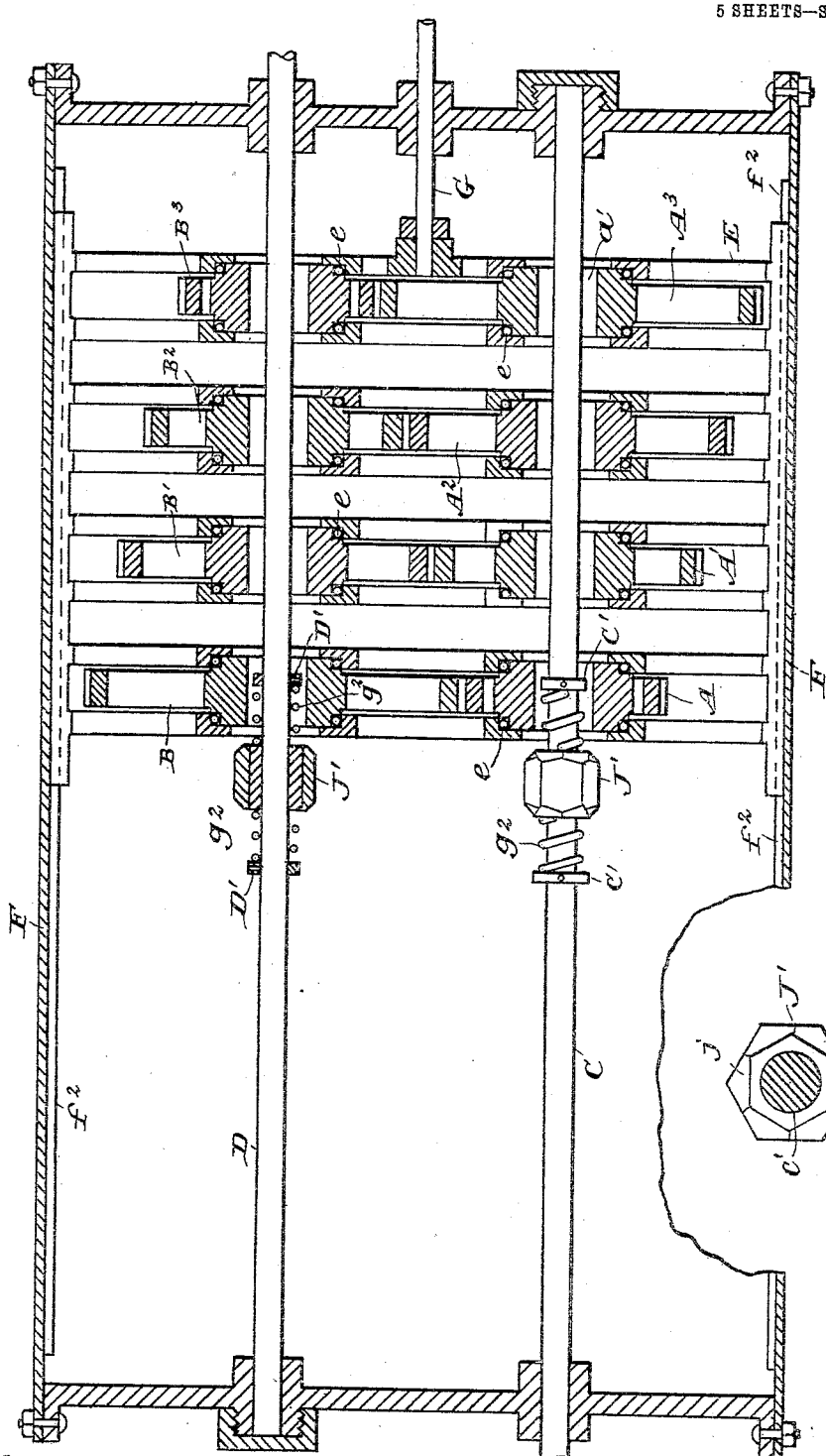

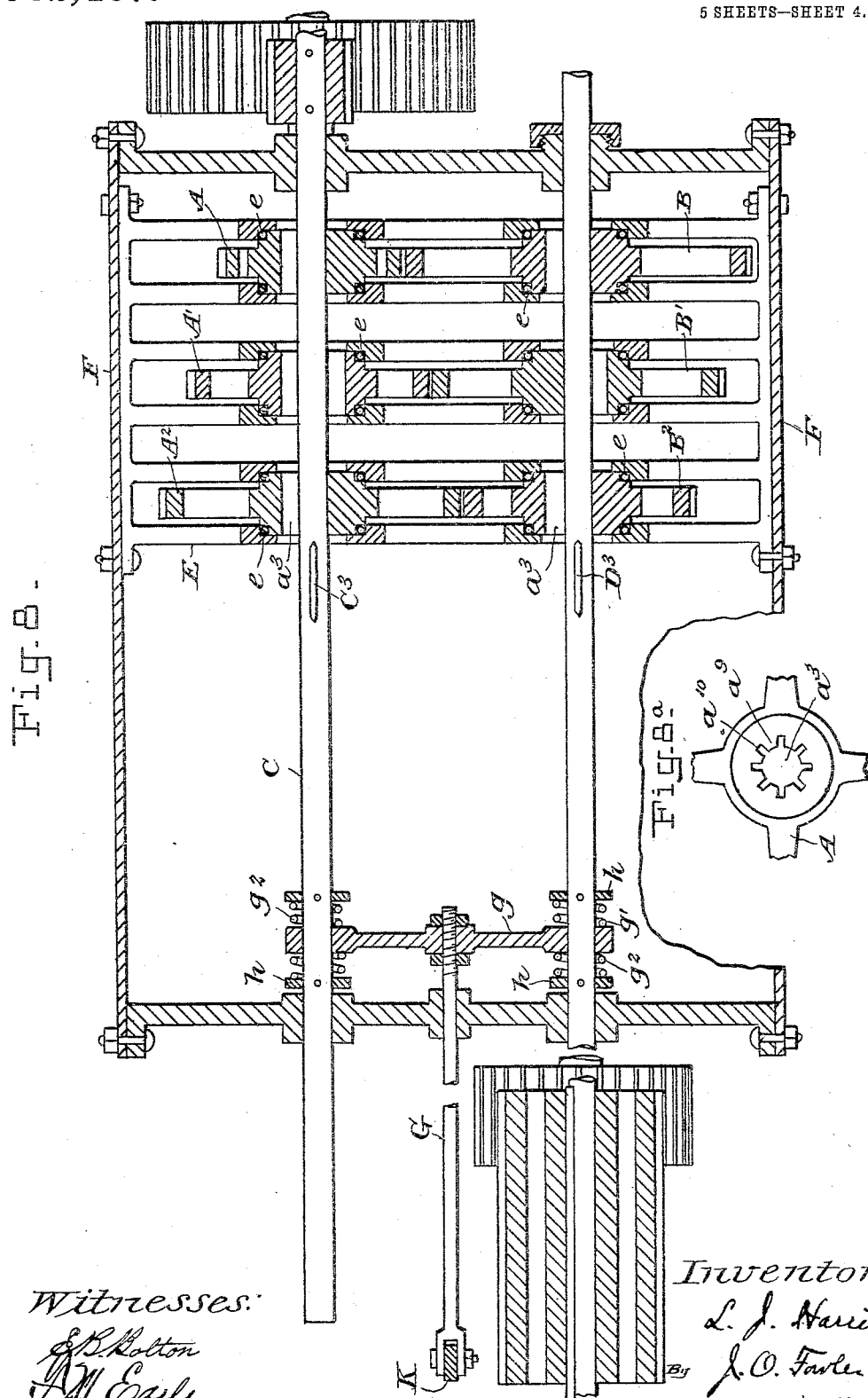

L. J. HARRIS.
POWER TRANSMITTING DEVICE.
APPLICATION FILED JAN. 10, 1902.

932,467.

Patented Aug. 31, 1909.
5 SHEETS—SHEET 5.

Witnesses:

Inventor:
L. J. Harris
By J. O. Fowler Jr.
his Attorney

UNITED STATES PATENT OFFICE.

LOUIE J. HARRIS, OF NEW YORK, N. Y.

POWER-TRANSMITTING DEVICE.

932,467.

Specification of Letters Patent. Patented Aug. 31, 1909.

Application filed January 10, 1902. Serial No. 89,170.

*To all whom it may concern:*

Be it known that I, LOUIE J. HARRIS, a citizen of the United States, and resident of New York, in the county and State of New York, certify that I have invented a certain new and useful Power-Transmission Device, of which the following is a specification.

My invention relates to means whereby power may be transmitted from a primary or power shaft to a secondary or counter shaft, the latter being, by the use of my device, started slowly, and then caused to run at an increased rate of speed without any shock, and afterward released instantly at will, as for use in automobiles, and it has for its object the provision of an apparatus of the kind set forth, simple in construction, inexpensive to manufacture, and which operates smoothly, steadily and noiselessly, and which combines compactness of structure and light weight, and also increased efficiency in practical operation.

To attain the desired end, this, my invention, consists in the construction, arrangement and operation of parts herein set forth.

In order to enable my invention to be fully understood, I will proceed to explain the same by reference to the drawings which accompany and form a part of this specification, in which—

Figure 9:
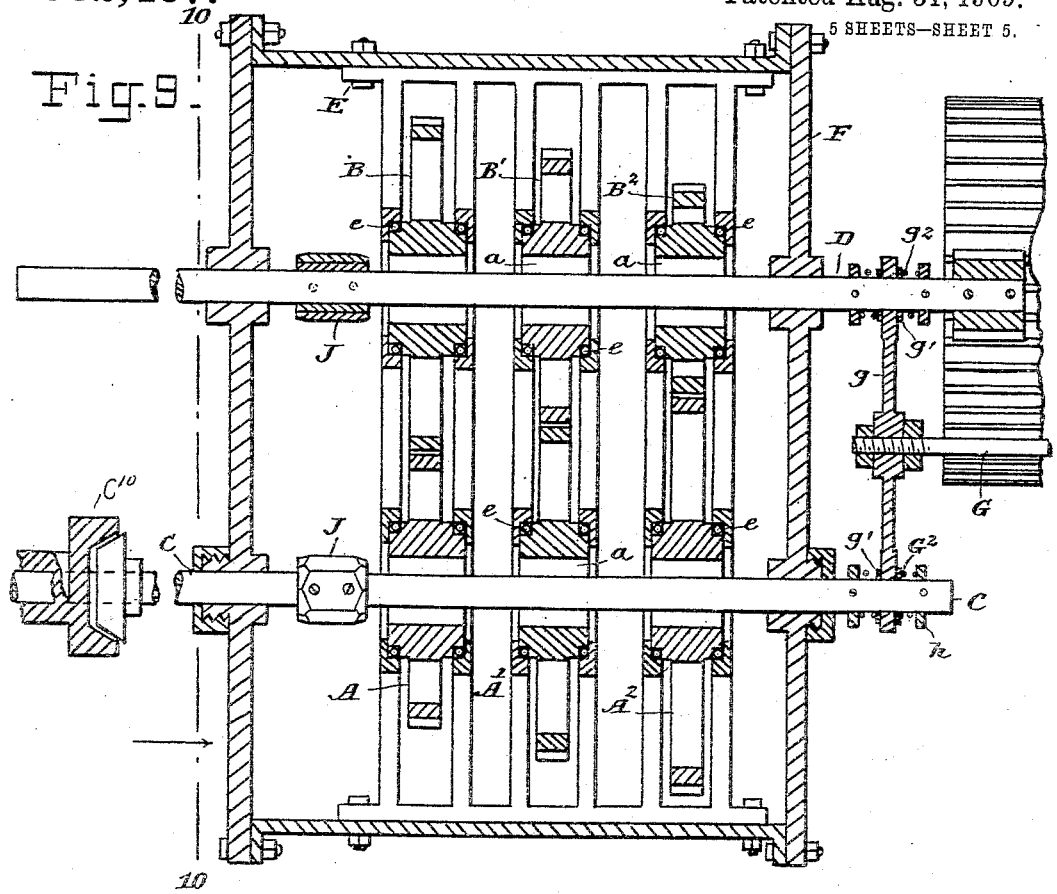
Figure 10:
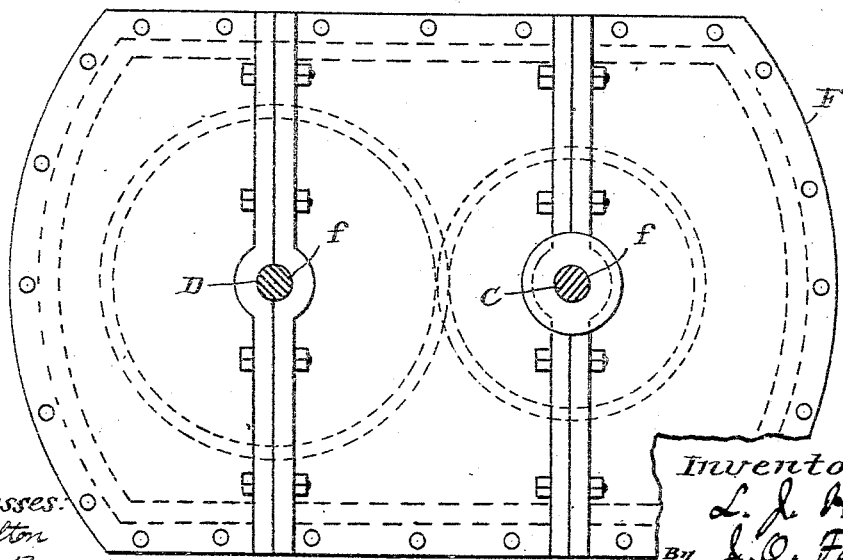

Figure 1 represents a horizontal section of the box or case containing my transmission gear; Fig. 2 is a vertical section taken on the line 2, 2, Fig. 1; Fig. 3 is a view in detail of the spring and connections by which the cage or frame supporting my gears is moved; Fig. 4 is an elevation of my core or block and connections; Figs. 5 and 6 are sections taken on the lines 5, 5, and 6, 6, Fig. 4; Fig. 6$^a$ is a detail. Figs. 7, 8 and 9 are horizontal sections of boxes containing other forms of transmission devices constructed according to my invention; Figs. 7$^a$ and 8$^a$ are details respectively of the cores and hubs shown in Figs. 7 and 8; and Fig. 10 is an elevation of the case or box containing my transmission gear.

Like letters of reference indicate like parts in all the views.

I have found it desirable to make a transmission gear of improved construction whereby the bad features of gears as formerly used, namely the crowding and breakage of teeth, continuous wear of the same, and loss of power by friction, and noise may be avoided, and I have, therefore, constructed according to my invention, an organization of the class described, embodying the preferred construction of parts, and their mutual relationship, combination, arrangement and organization in a composite body or structure, as hereinafter described.

Referring particularly to the drawings A, A', A$^2$, A$^3$ and B, B', B$^2$, B$^3$ denote pairs of normally passive differential transmission gears each provided with a non-circular bore or central orifice $a$, the members A to A$^3$ of the said gears being concentric with the power or primary shaft C, which passes through the bore $a$, and the members B to B$^3$ being concentric with the secondary or counter shaft D, the said shaft C being preferably driven by means controlled by a clutch C$^{10}$, as shown in Fig. 9.

The various members of the several pairs of gears are suitably and independently mounted in a cage or frame E, as by ball bearings $e$, and they are all normally passive and independent both as regards each other and also the shafts C and D.

I provide means, as a movable interlocking device, whereby the various pairs of gears may be put in operative relation with the practically square shafts C and D *seriatim*, the several members A to A$^3$ being rotated, when interlocked at the proper time, by means of the shaft C, and the members B to B$^3$,—which are continuously in mesh with their respective gears A to A$^3$,—serving to impart power, when operated, to the shaft D. A number or variety of these movable interlocking devices may be constructed according to my invention. For example, the cage or frame containing the gears and the shafts may be stationary, and a block or core may be moved along the shafts to engage the bores of the several pairs of differential gears *seriatim;* or the cage or frame may be movable, and the shafts together with the cores or blocks may be stationary, the gears in this instance traveling over the cores or blocks; or the cage or frame may be rigidly attached to the containing box or case, and the shafts, provided with splines or blocks, may be movable, the splines or blocks in this case serving to engage the various pairs of differential gears *seriatim*.

I will now proceed to describe some of the interlocking devices suitable to be used in connection with my transmission gear.

In Fig. 1, the cage or frame E is rigidly attached to the interior of a closed box or case F, provided with bearings $f$ for the horizontal shafts C and D, and preferably containing lubricating material. Another bearing $f'$ is provided in said box or case for the bar G which is attached to a lever K, and also secured to an arm $g$ provided at its extremities with blocks $g'$ which encircle and are movable upon the shafts C and D, and work over the plates H, a pair of which lie adjacent to and are slidable respectively upon two opposite and parallel faces of each of the shafts C and D.

At one end of each pair of plates H is secured an octagonal block or core J constructed and arranged to register with the angular bore or central orifice $a$ of the gears. The opposite ends of each of said pair of plates are provided with a pair of collars $h$, intermediate which the blocks $g'$ holding the ends of the arm $g$ work;—springs $g^2$ lying between the blocks $g'$ and the collars $h$. The angles at the edge of the blocks J are cut away in order to allow the said blocks to more readily enter the bores $a$.
In Fig. 7, the cage or frame E retaining the vertical transmission gears slides within the case or box F on ways or tracks $f^2$, and is attached directly to the bar G. The shafts C and D are respectively provided with collars C' and D', intermediate which are placed sleeves consisting of hexagonal blocks or cores J', between which and the said collars are located springs $g^2$. The blocks or cores J' respectively engage with the bores $a'$ of the transmission gears.

In Fig. 8, the arm $g$ of the link G works in blocks $g'$ and is situated between springs $g^2$ placed intermediate collars $h$, as in Fig. 1. In this instance, however, the collars are rigidly secured to the shafts C and D. The said shafts are respectively provided with splines $C^3$, $D^3$, which are constructed and arranged to engage with the teeth $a^9$ and work in the grooves or recesses $a^{10}$ formed at the centers of each of the transmission gears, and surrounding the orifices $a^3$, whenever the said shafts are moved by the lever G,—the cage or frame E being in this instance fastened to the interior of the case F, as in Fig. 1.
In Fig. 9, the parts are similar in construction to that shown in Fig. 8, with the exception that the shafts C and D carry cores or blocks rigidly attached thereto, instead of splines, and the said blocks and the central bore or orifice of the gears are similar to those shown in Figs. 7 and 7$^a$.

It will be observed by reference to Fig. 10 that the casing F consists of a number of sections bolted around and—together with the gears—supported by the shafts C and D, and that the said intermeshing gears A, A', A$^2$ and A$^3$ and B, B', B$^2$ and B$^3$, although in the present embodiment being mounted around the shafts C and D and free from contact therewith, are yet primarily and incidentally supported by the inner cage or frame E, which also incloses the said shafts, the said part E being in turn inclosed in an outer casing F, the sections of which are, as stated, mounted and fastened on the said shafts C and D, which may be moved laterally as in Fig. 8. The shafts thus support the casings E, F inclosing the shafts (on which casings the two sets of gear wheels are mounted) and the said shafts serve to provide the fundamental support for the said gear wheels, and therefore the said separate gear wheels of different size are, broadly speaking, loosely mounted on and held in operative position and supported on each of the said shafts.

It is manifest that various omissions of some particulars could be made without materially affecting the essential features of my invention, or the operation of the remaining parts, and I do not, therefore, wish to be limited to the specific structural details of the organization herein set forth. Obviously, the elements of the structure described may be located at an angle to the plane in which they are shown. I, accordingly, use the words "horizontal," "vertical," and the like, in a relative sense.

In operation, when the lever K is moved for the purpose of starting the shaft D in motion, the bar G is pulled in a forward direction, thus carrying along the blocks $g'$, plates H and cores J, which slide on the shafts C and D as shown in Fig. 1. Inasmuch as the shaft C is preferably in continuous rotation, the core or blocks J, when they enter the bores or central apertures $a$ of the first pair of normally passive vertical transmission gears A, B, serve to start the said gears in motion, and the horizontal shaft D will be rotated at a certain rate of speed as regards the shaft C. By now pulling the bar G, farther along, the cores J will leave the first pair of gears A and B, and will enter the hollow hubs of the next pair of gears, namely, A', B', and the shaft D will now be rotated at a higher rate of speed than before; and by thus engaging the cores J successively with the other pairs of gears A$^2$, B$^2$, and A$^3$, B$^3$, the shaft D will be caused to turn still more rapidly as regards the shaft C. By reversing the movement of the lever K and bar G, the shaft D may be caused to revolve at a lower rate of speed, or stopped altogether.

In the form of transmission gear shown in Fig. 7, the movement of the lever K and bar G causes the cores or blocks J and the hubs of the gears to become differentially engaged, by sliding the cage or frame E,—carrying the said gears and attached to the bar G,— over the blocks J' respectively carried by the shafts C and D. The movable interlocking mechanism shown in Figs. 8 and 9 comprises projecting portions, as the splines $C^3$, $D^3$ or cores or blocks J secured to the shafts C and D, which are constructed and arranged to differentially engage the several pairs of transmission gears carried by the cage E.

It will be noted that in all the different forms of my movable interlocking device shown, the engagement of the parts is a gradual one, on account of the springs $g^2$ which lie intermediate the block $g'$ and the collars $h$; or, as in Fig. 7, between the cores or blocks $J'$ and the collars $C'$ and $D'$. The shaft D will thus be started with an easy or slow and gradual movement, whereby all shocks are avoided, and by moving the lever K and bar G backward rapidly, the shaft D may be released instantly. Inasmuch as only one pair of transmission gears are in operation at one time, the wear and consequent looseness and loss of power by friction, and noise usually observed in apparatuses of this kind is done away with, and as the several pairs of gears are continuously meshed together, the crowding and breakage of the gear teeth is entirely obviated.

Obviously my transmission gear may be embodied in other forms of mechanism than that which I have described, and is applicable to and may be advantageously employed in many kinds of power transmitting devices, and I do not, therefore, wish to limit myself to the use of my device in connection with automobiles alone.

As it is evident that many changes in the construction, form, proportion and relative arrangement of parts might be resorted to without departing from the spirit and scope of my invention, I would have it understood that I do not restrict myself to the particular construction and arrangement of parts shown and described, but that such changes and equivalents may be substituted therefor, and that

What I claim as my invention is:—

1. In a power transmitting device, a driving and a driven shaft, a pair of normally passive gears oppositely disposed over but unsupported by said shafts, a structure to hold the gears in an intermeshing relation, and interlocking means having a yielding connection with a common controlling device to form an operative connection between the gears and their shafts, in combination with said controlling device.

2. In a power transmitting device, a driving and a driven shaft, a pair of normally passive gears oppositely disposed over but unsupported by said shafts, a closed structure to contain lubricating material and to hold the gears in an intermeshing relation, and interlocking means having a yielding connection with a common controlling device to form an operative connection between the gears and their shafts, in combination with said controlling device.

3. A structure having an interior receptacle to contain a lubricating material and adapted to afford a bearing, the structure having a division passing longitudinally through the center of the bearing, and consisting of a plurality of parts constructed and arranged to be secured together, in combination with a shaft to work in the bearing and having a projecting portion to rotate within the said structure and to pass through the lubricating material, and also with gear wheels constructed and arranged to be also rotated in the lubricating material by the revolution of the shaft, whereby some of the lubricating material is lifted up and caused to drop again at every revolution of the shaft.

4. A structure having an interior receptacle to contain a lubricating material and adapted to afford a bearing, the structure having a division passing longitudinally through the center of the bearing, and consisting of a plurality of parts constructed and arranged to be secured together, in combination with a shaft to work in the bearing and having a device projecting from the periphery thereof to rotate within the said structure and to pass through the lubricating material, whereby some of the lubricating material is lifted up and caused to drop again at every rotation of the shaft.

5. A speed-changing mechanism, comprising two shafts, separate gears of different size revolubly supported, the gears encircling one shaft meshing with those encircling the other shaft in reverse order, means for locking each shaft to any one gear thereabout, and interconnected means for operating said locking means to unlock the shafts from one pair of meshing gears and to lock them to another pair of meshing gears.

6. The combination with a main shaft, a countershaft, a plurality of intermeshing gear wheels each provided with locking recesses, a key for coupling and uncoupling each shaft with the gear wheels, and means for simultaneously moving said keys from one pair of meshing gears to another pair.

7. In a variable speed mechanism, a driving shaft adapted to be adjusted endwise and provided with a key, supporting means, a series of gears loosely mounted thereon, and respectively adapted to be engaged with said shaft and driven by said key, a driven shaft provided with a key and adapted to be shifted endwise, supporting means, and a series of gears mounted thereon and engaged with said driven shaft and in mesh with the gears on the driving shaft, and adapted to respectively impart motion to the driven shaft by means of the key carried by the driven shaft.

8. A speed changing mechanism comprising two shafts, supporting means, separate gears of different sizes revolubly mounted thereon and engaged with each shaft, the gears on one shaft meshing with those on the other shaft in reverse order, means for locking each shaft to any one gear thereon, and interconnected means for operating said locking means to unlock the shafts from one pair of meshing gears and to lock them to another pair of meshing gears.

9. A speed changing mechanism comprising two shafts, supporting means, separate gears of different sizes revolubly mounted thereon and engaged with each shaft, the gears on one shaft meshing with those on the other shaft in reverse order, each shaft movable axially with reference to the gears thereon, a feather for locking each shaft to any one gear thereon, and means for shifting the shafts through the gears and thereby unlocking them from one pair of meshing gears and locking them to another pair of meshing gears.

10. A speed changing mechanism comprising two shafts, supporting means, separate gears of different sizes revolubly mounted thereon and engaged with each shaft, the gears on one shaft meshing with those on the other shaft in reverse order, each shaft movable axially with reference to the gears thereon, a feather for locking each shaft to any one gear thereon, and connections between the two shafts whereby the axial movement on one shaft effects the axial movement of the other shaft.

11. A speed changing mechanism comprising two shafts, separate gears of different size encircling or surrounding each shaft in a revoluble relation, the gears of one shaft meshing with those of the other shaft in reverse order, means for locking each shaft to any one gear thereon, and interconnected means for operating said locking means to unlock the shafts from one pair of meshing gears and to lock them to another pair of meshing gears.

12. A speed changing mechanism comprising two shafts, separate gears of different size encircling or surrounding each shaft in a revoluble relation, the gears of one shaft meshing with those of the other shaft in reverse order, each shaft being movable axially with reference to the gears thereabout, a feather for locking each shaft to any one gear thereon, and means for shifting the shafts through the gears and thereby unlocking them from one pair of meshing gears and locking them to another pair of meshing gears.

13. A speed changing mechanism comprising two shafts, separate gears of different size encircling or surrounding each shaft, the gears of one shaft meshing with those of the other shaft in reverse order, each shaft movable axially with reference to the gears thereabout, and connections between the two shafts whereby the axial movement of one shaft effects the axial movement of the other shaft.

14. A speed changing mechanism comprising two shafts, two series of separate gears of different size, the gears of one shaft meshing with those of the other shaft in reverse order, each shaft movable axially with reference to the gears thereon, a feather for locking each shaft to any one gear thereabout, and means for shifting the shafts through the gears and thereby unlocking them from one pair of meshing gears and locking them to another pair of meshing gears.

15. A speed changing mechanism comprising two shafts and two series of separate gears of different size, the gears of one shaft meshing with those of the other shaft in reverse order, each shaft movable axially with reference to the gears thereabout, a feather for locking each shaft to any one gear thereon, and connections between the two shafts whereby the axial movement of one shaft effects the axial movement of the other shaft.

16. In a variable speed mechanism, a driving shaft adapted to be adjusted endwise and provided with a key, a series of gears loosely supported and adapted to be respectively engaged and driven by said key, a driven shaft provided with a key and adapted to be shifted endwise, and a series of gears in mesh with the gears of the driving shaft, and adapted to respectively impart motion to the driven shaft by means of the key carried by the driven shaft.

17. In a variable speed mechanism, a driving shaft, a driven shaft, gears oppositely disposed and concentrically mounted around said shafts, free from contact therewith and in mesh with each other, a clutch on each of said shafts adapted to travel through the bores of said gears and to fix said gears to their respective shafts, and a common means for shifting the said clutches.

18. In a variable speed mechanism, a driving shaft, a driven shaft, a plurality of different sized gears through the bores of which said shafts pass, clutch members on the respective shafts adapted to travel through the bores of the gears, and to respectively bring into operation different pairs of said gears to effect a change of speed, and a common means for shifting the said clutches.

In testimony of the foregoing specification I do hereby sign the same in the city of New York, county and State of New York this 24th day of December A. D., 1901.

LOUIE J. HARRIS.

Witnesses:
ROB. SCHWARZ,
J. ODELL FOWLER, Jr.